Figure 1:
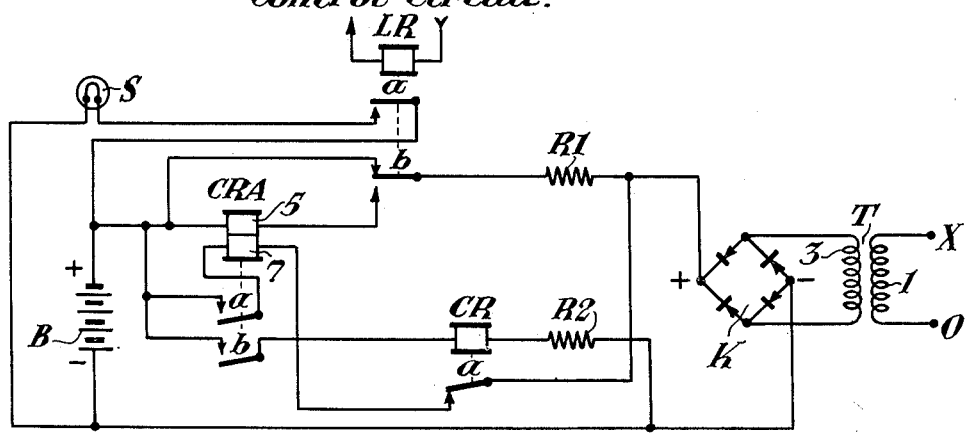

Feb. 27, 1951         A. E. DODD         2,543,314
BATTERY CHARGING APPARATUS
Filed Feb. 25, 1950         2 Sheets-Sheet 1

Continuity Transfer Contact.

INVENTOR.
Arthur E. Dodd.
BY
W. L. Stout
HIS ATTORNEY

Feb. 27, 1951 A. E. DODD 2,543,314
BATTERY CHARGING APPARATUS
Filed Feb. 25, 1950 2 Sheets-Sheet 2

INVENTOR.
Arthur E. Dodd.
BY
W. L. Stout
HIS ATTORNEY

Patented Feb. 27, 1951

2,543,314

UNITED STATES PATENT OFFICE 2,543,314

BATTERY-CHARGING APPARATUS

Arthur E. Dodd, Edgewood, Pa., assignor to The Union Switch & Signal Company, Swissvale, Pa., a corporation of Pennsylvania Application February 25, 1950, Serial No. 146,370

17 Claims. (Cl. 320—24)

My invention relates to battery charging apparatus and particularly to battery charging apparatus of the type wherein provision is made for charging a battery at two different rates and wherein automatic means are provided for changing from the higher rate to the lower rate when the battery becomes fully charged.

It has previously been proposed to provide apparatus of the type described in which a voltage-sensitive relay is connected across the terminals of the battery, the relay being constructed and arranged so that its contacts are picked up when the voltage of the battery is greater than a predetermined value, and its contacts are released when the voltage of the battery is less than a predetermined value. The contacts of the relay operate to cut out or shunt a resistor in the charging circuit of the battery when the contacts are released, so that when the battery has a low terminal voltage, the charging current is increased and when the battery is charged to its normal voltage, the charging current is reduced to a value sufficient to keep the battery at or slightly above its normal voltage, that is, the battery is "trickle charged." Moreover, it has previously been proposed to govern the voltage-sensitive relay by contacts of other relays which connect load circuits to the battery, so that the voltage-sensitive relay is connected to the battery only when a heavy load current is being drawn from the battery.

These arrangements do not provide for keeping the voltage-sensitive relay disconnected from the battery at all times should the source of charging energy fail. Under such conditions, the energy consumed by the voltage-sensitive relay would cause the battery to become discharged more quickly than if the relay was disconnected.

Accordingly, it is an object of my invention to provide an arrangement of battery charging apparatus in which the voltage-sensitive relay is disconnected from the battery when necessary, including any time in which there is an interruption of the charging energy supplied to the battery, and when the battery is being charged at a low rate.

A further object of my invention is to provide battery charging apparatus of the type described requiring only one additional or auxiliary relay in addition to the voltage-sensitive relay.

Another object of my invention is to provide battery charging apparatus of the type described in which the auxiliary relay and the voltage-sensitive relays are normally disconnected from the battery and the source of charging energy, so that no energy is required for these relays under normal conditions.

Other objects of my invention and features of novelty thereof will be apparent from the following description taken in connection with the accompanying drawings.

In practicing my invention, I provide, in addition to the voltage-sensitive relay, which hereinafter I shall refer to as the "charge control relay," an auxiliary relay, which is governed by one of the contacts which apply a load to the battery. The auxiliary relay governs the charge control relay, and the circuits are arranged so that when the auxiliary relay is picked up, the charge control relay is connected across the battery. Furthermore, the auxiliary relay is provided with a holding or stick circuit including a contact of the charge control relay, so that when the auxiliary relay is once energized as a result of the load being connected to the battery, it remains energized until the charge control relay is picked up as a result of the battery voltage attaining a predetermined value. The charging energy supplied to the battery is governed by circuits including the contacts of the auxiliary relay. Since the auxiliary relay is energized from the source of charging energy, any interruption of the supply charging energy will cause the auxiliary relay to release, and thereby disconnect the voltage-sensitive relay from the battery.

I shall describe three forms of battery charging apparatus embodying my invention, and shall then point out the novel features thereof in claims.

Figure 2:
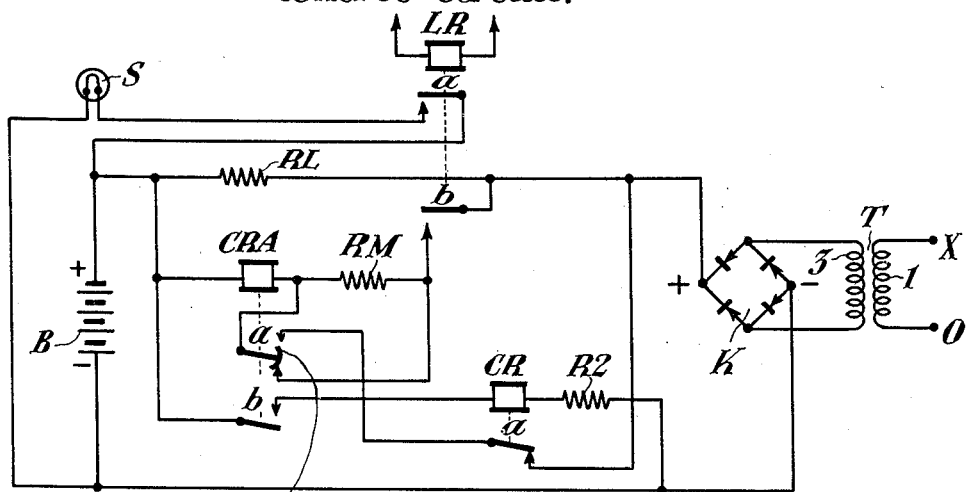
Figure 3:
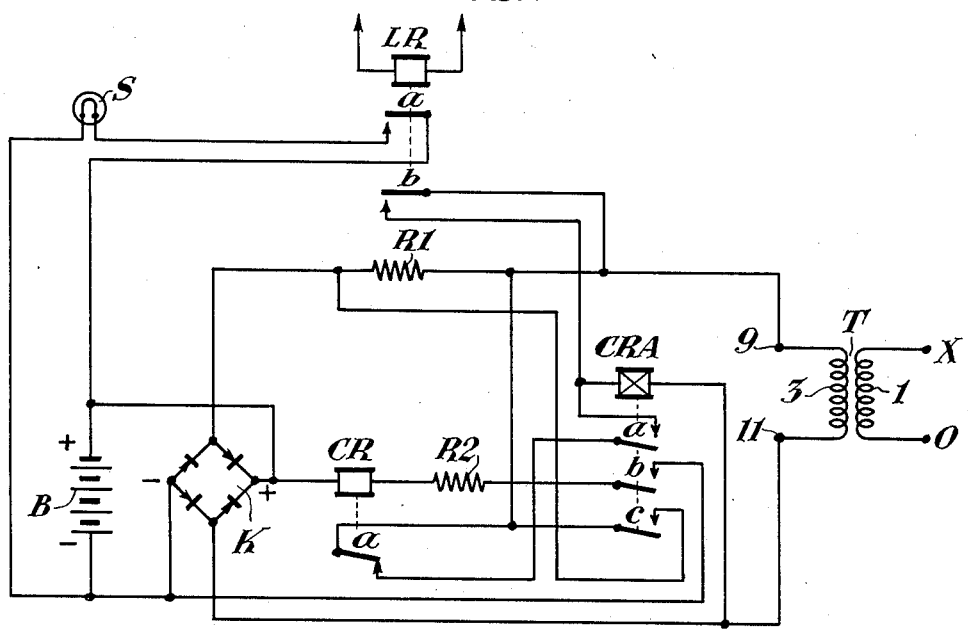

In the accompanying drawings,

Fig. 1 is a diagrammatic view showing an arrangement of battery charging apparatus embodying my invention in which an auxiliary relay having two windings is employed, Fig. 2 shows an alternative arrangement employing an auxiliary relay having a single winding, and Fig. 3 shows an alternative arrangement employing an auxiliary relay operated by alternating current energy, which is also rectified and supplied as charging energy to the battery.

Similar reference characters refer to similar parts in each of the several views.

Referring first to Fig. 1, the reference character T designates a transformer, the primary winding 1 of which has its terminals X and O connected to a suitable source of alternating current which is not shown in the drawings. The secondary winding 3 of transformer T is constantly connected with the input terminals of a full wave rectifier K, which rectifies the alternating current supplied thereto to provide suitable charging energy for a battery B. At times, the terminals of battery B are connected with a load S by a circuit including a contact of a circuit controller such as back contact $a$ of a control relay LR. The load S may, for example, be an electric lamp associated with a railway signal, and the relay LR may be the usual device for connecting the battery with or disconnecting it from the lamp. The actual control circuits for the relay LR form no part of my present invention and are therefore not shown in the drawings. Additionally, there is provided a charge control relay CR, having an associated resistor R2, an auxiliary relay CRA having an upper winding 5 and a lower winding 7, and a charge control impedance R1, which may be either a resistor or a reactor, and is here shown as a resistor. The relay CR and resistor R2 are constructed and proportioned so that the operation of relay CR is relatively independent of changes in the ambient temperature. Moreover, relay CR is constructed and arranged so that it is responsive to the voltage of the energy supplied thereto. Relay CR is connected across the terminals of battery B by a front contact $b$ of relay CRA and when so connected is responsive to the voltage of battery B, that is, when the voltage of battery B is below a predetermined value, the contact $a$ of relay CR will be released, and when the voltage of battery B reaches another predetermined value or exceeds this second predetermined value, the contact $a$ of relay CR will be picked up.

The apparatus is shown in its normal condition, with the control relay LR energized, so that the load S is disconnected from the battery B by a contact $a$ of relay LR. At this time, charging energy is supplied to the battery B by a circuit which may be traced from a positive terminal of the rectifier K, through the resistor R1, over front contact $b$ of the relay LR, to the positive terminal of battery B, and from the negative terminal of battery B to the negative terminal of rectifier K. Resistor R1 is proportioned so that the value of energy which is supplied to the battery B is just sufficient to keep the battery charged to its normal voltage, this procedure being well known as trickle charging. At this time, no energy will be supplied to the winding of relay CR, due to contact $b$ of relay CRA being released, and relay CRA has no energy supplied to either of its windings, the circuit for winding 5 being open at back contact $b$ of relay LR, and the circuit for the winding 7 of relay CRA being open at contact $a$ of relay CRA.

It will now be assumed that relay LR releases, so that energy is supplied to the load or lamp S from the battery B over the circuit including back contact $a$ of relay LR. When contact $b$ of relay LR releases, energy of a value slightly smaller than the value of the trickle charging energy is supplied from the rectifier K to the battery B through a circuit including the resistor R1, back contact $b$ of relay LR, and the winding 5 of auxiliary relay CRA. Relay CRA is constructed and arranged so that the value of current which flows through the winding 5 at this time is sufficient to cause the relay to pick up its contacts. When contact $a$ of relay CRA picks up, it establishes a high rate charging circuit for supplying energy from rectifier K to relay B. This circuit may be traced from the positive terminal of the rectifier K, over back contact $a$ of relay CR, through the winding 7 of relay CRA, over front contact $a$ of relay CRA, to the positive terminal of battery B, while the negative terminal of battery B is connected to the negative terminal of rectifier K. The winding 7 of relay CRA is constructed and arranged to have comparatively low resistance, so that a much larger value of current flows through the circuit traced through this winding, so that the supply of charging energy to the battery B is substantially increased. The trickle charging energy supplied through the resistor R1 and winding 5 of relay CRA continues to flow at this time. Moreover, the windings of relay CRA are constructed and arranged so that the flux produced by the current flowing through the winding 7 is in such direction as to aid the flux produced by the winding 5, so that the relay remains picked up under these conditions. At this time, the winding of relay CR and its associated resistor R2 are connected across the terminals of battery B, by the circuit including front contact $b$ of relay CRA.

It will now be assumed that the voltage of battery B reaches its normal value, while the load S is still connected to the battery, that is, the relay LR continues to remain released. When the voltage of the battery reaches a predetermined value, relay CR will pick up, and its back contact $a$ will interrupt the circuit for supplying high rate charging energy through the winding 7 of relay CRA to the battery B. However, back contact $b$ of relay LR remains released, so that energy is supplied through the resistor R1, back contact $b$ of relay LR, and the winding 5 of relay CRA to battery B, at the low charging rate. Accordingly, it will be seen that when the voltage of the battery reaches the predetermined value with the load connected to the battery, the high rate of charging is interrupted, and the battery continues to charge at the low charging rate. Thereafter, when relay LR picks up and disconnects the load from the battery, contact $b$ of relay LR interrupts the supply of energy to winding 5 of relay CRA, and relay CRA releases. At this time, energy is supplied to the battery by the circuit originally traced, comprising resistor R1 and front contact $b$ of relay LR, so that the battery is now charged at the trickle charging rate, as originally described.

If, with the load connected to the battery by the relay LR being released, the voltage of the battery remains sufficiently low so that relay CR does not pick up while relay LR is released, the following action will take place when relay LR picks up; when contact $b$ of relay LR picks up, the supply of energy to the winding 5 of relay CRA is interrupted, but at this time the stick circuit including front contact $a$ of relay CRA and the winding 7 of relay CRA is closed since contact $a$ of relay CR is released. Accordingly, the high rate charging energy will be supplied through this circuit to the battery B, so that the battery will continue to charge at the high rate even though the load is disconnected from the battery. When the voltage of the battery eventually reaches the value sufficient to cause relay CR to pick up its contact $a$, contact $a$ will interrupt the circuit including the winding 7 of relay CRA, and relay CRA will release. When contact $a$ of relay CRA releases, it interrupts the circuit including winding 7 of relay CRA, and when contact $b$ of relay CRA releases it opens the circuit for connecting the relay CR across the terminals of the battery. When relay CR releases, its contact $a$ again closes in the circuit including winding 7 of relay CRA, but at this time the contact $a$ of relay CRA maintains its circuit interrupted so that both relays remain released, thus restoring the circuit to its original condition with trickle charging rate energy supplied to the battery through the resistor RL and front contact $b$ of relay LR.

It will further be assumed that at some time with the relay CRA picked up to thereby connect relay CR across the terminals of the battery, that the source of charging energy is interrupted, due to an interruption in the supply of alternating current to the transformer T or other derangement of the parts. It will be seen that under such a condition, the supply of energy through the windings of relay CRA is interrupted, so that relay CRA releases and its contact $b$ interrupts the circuit for relay CR so that relay CR is disconnected from the battery B. Thus, the low resistance winding of relay CR is kept disconnected from the battery B, so that it does not constitute an additional drain upon the battery with the charging current removed. If the relay LR should release during the time the charging current is interrupted, and be released at the time the supply of charging energy is again resumed, it will be seen that current will be supplied through the winding 5 of relay CRA at the low rate, causing the relay CRA to pick up, and when its front contact $a$ closes, the high rate charging circuit including the winding 7 of relay CRA is established and the winding of the charge control relay CR is again connected across the battery as previously described.

From the foregoing, it will be seen that my invention provides an arrangement of battery charging apparatus in which the battery is normally supplied with a low rate charging current, which is automatically increased when a load is connected to the battery, and additionally, provides an arrangement whereby the charge control relay is automatically disconnected from the battery at all times except when needed.

Referring now to Fig. 2, there is shown a modification of the arrangement shown in Fig. 1 and described above, in which the auxiliary relay CRA has but one winding, and is provided with a special continuity transfer contact to achieve the same type of operation as provided by the double-wound relay CRA of Fig. 1. The arrangement shown in Fig. 2 provides an additional intermediate charging rate in addition to the high and low rates, so that an intermediate value of charging energy is supplied to the battery B at times.

The apparatus is shown in its normal condition, and at this time energy is supplied from the rectifier K to the battery B by an obvious circuit including the resistor RL, which is arranged and proportioned so that only a low value of current is supplied to the battery, so that the battery is trickle charged with no load connected thereto. Relays CRA and CR are released at this time, and the relay LR is picked up to disconnect the load from the battery.

It will now be assumed that relay LR releases and its back contact $a$ connects the lamp S across the battery. When contact $b$ of relay LR releases, an additional circuit is established for supplying energy to the battery B from the rectifier K, which circuit may be traced from the positive terminal of the rectifier K, over back contact $b$ of relay LR, over back contact $a$ of relay CRA, through the winding of relay CRA to the positive terminal of battery B, while the negative terminal of battery B is connected to the negative terminal of rectifier K. The value of current supplied through this circuit is sufficient to cause relay CRA to pick up its contacts, and accordingly, contact $a$ picks up. When contact $a$ of relay CRA is picked up, a stick circuit is completed which may be traced from the positive terminal of the rectifier K, over back contact $a$ of relay CR, over front contact $a$ of relay CRA, and winding of relay CRA to the positive terminal of battery B. The contact $a$ of relay CRA is of the type known as a continuity transfer contact, and is adjusted and arranged so that it overlaps between its front and back contacts, that is, during a portion of the travel of the contact $a$ from its released to its picked up position, it establishes both the front and back contacts, so that there is a continuous supply of energy afforded to the winding of relay CRA during the picking up of its contacts.

From the foregoing, it will be seen that at this time with the relay LR released to connect the load S to the battery B, a circuit is established for supplying energy to the battery B from the rectifier K which includes only the resistance of the winding of relay CRA. The winding of this relay is constructed and arranged to have a comparatively low resistance, so that at this time a high rate of charge is established for the battery B. The low rate of charging current supplied through resistor RL, is of course, continuously supplied to the battery, so that this current adds to that flowing through the circuit traced above.

When contact $b$ of relay CRA is picked up, the winding of the charge control relay CR is connected across the terminals of the battery by contact $b$ of relay CRA.

It will now be assumed that the voltage of battery B reaches the value required to cause the contacts of relay CR to pick up, and when contact $a$ of relay CR picks up, it interrupts the circuit for supplying energy through the winding of relay CRA to battery B, but relay CRA does not release at this time, since energy is now supplied through its winding of relay CRA to battery B, but relay CRA does not release at this time, since energy is now supplied through its winding by a circuit which includes back contact $b$ of relay LR and the resistor RM, and the parts are arranged and proportioned so that the current which flows through the winding of relay CRA at this time is sufficient to cause the relay to maintain its contacts in their picked up position. It will be seen however, that an additional resistance RM has been inserted in the circuit for supplying energy to the battery B, so that at this time an intermediate rate of charge is established for battery B.

With the charge control relay CR picked up and the intermediate charging rate established for battery B, when relay LR picks up to disconnect the load from the battery, its contact $b$ interrupts the circuit for supplying energy to the battery through the resistor RM and the winding of relay CRA, and as a result, relay CRA releases, and its front contact $b$ disconnects the winding of relay CR from the battery. Relay CRA will remain released after relay CR releases, since, even though back contact $a$ of relay CR is again closed, the stick circuit for relay CRA is interrupted by contact $a$ of relay CRA. The apparatus is therefore restored to its normal condition with a low rate of charging current supplied through the resistor RL from the rectifier K to the battery B.

If relay LR should release and thus establish the high rate of charging for battery B, and thereafter pick up before the charge control relay CR picks up its contact due to the battery reaching its normal voltage, relay CRA will remain energized by the high rate charging current which flows over back contact $a$ of relay CR and front contact $a$ of relay CRA through the winding of relay CRA to the positive terminal of battery B. When the voltage of battery B reaches its predetermined value, the relay CR will pick up to interrupt this stick circuit, and relay CRA will release, thereby opening the circuit for relay CR, so that both relays are released and remain released, thus restoring the circuit to its normal condition.

It will be obvious that the arrangement shown in Fig. 2 operates in a manner similar to the arrangement shown in Fig. 1, should the supply of charging energy to the battery B be interrupted. Relay CRA is responsive to the energy supplied to the battery B, and if this supply should be interrupted, both relays will be released, due to the opening of contact $b$ of relay CRA which disconnects the winding of the charge control relay from the battery, so that, as in Fig. 1, the winding of this relay is kept disconnected from the terminals of the battery except at such times as needed.

From the foregoing, it will be seen that the arrangement shown in Fig. 2 operates in a manner similar to that described for Fig. 1, with the exception that an auxiliary relay CRA is provided with but one winding and a special continuity transfer contact. Additionally, the provision of a resistor RM in the circuit for relay CRA provides an intermediate charging rate for the battery B.

Referring now to Fig. 3, the arrangement shown therein differs from the arrangement shown in Figs. 1 and 2 in that the charging rate resistor R1 and the auxiliary relay CRA are interposed in the circuit which supplies energy from the transformer T to the rectifier K, rather than being interposed in the circuit for supplying direct current energy from the rectifier K to the battery B. This location is preferable in some cases to the location between the rectifier and the battery, since it results in a lower voltage across the rectifier during the low rate charge condition.

In Fig. 3, relay CRA is a relay which is responsive to alternating current, and the resistor R1, as previously explained, may consist of a reactor or a resistor, and is here shown as a resistor.

The apparatus is shown in the drawing in its normal condition, with a low rate of charging energy being supplied to the battery B. At this time, the load S is disconnected from the battery B because the relay LR is picked up. Additionally, relays CRA and CR are both released. Energy is supplied from the secondary winding 3 of transformer T to the input terminals of rectifier K by a circuit which includes the resistor R1. Accordingly, a low rate of charge is established for the battery B, since the energy supplied to the rectifier K is limited by the resistor R1.

It will now be assumed that relay LR releases, and its back contact $a$ connects the load S across the terminals of the battery B. When contact $b$ of relay LR releases, it establishes a pick-up circuit for supplying energy to the winding of relay CRA, which circuit may be traced from terminal 9 of the secondary winding 3 of transformer T, over back contact $b$ of relay LR, and through the winding of relay CRA to terminal 11 of secondary winding 3 of transformer T. Accordingly, relay CRA is picked up. A stick circuit is established for relay CRA when its contacts pick up, and this circuit may be traced from terminal 9, over back contact $a$ of relay CR, over front contact $a$ of relay CRA, and through the winding of relay CRA to terminal 11. When contact $b$ of relay CRA picks up, it establishes a circuit for connecting the winding of relay CR with its associated resistor R2 across the terminals of the battery B. This circuit may be traced from the positive terminal of battery B, through the winding of relay CR and resistor R2, over front contact $b$ of relay CRA, to the negative terminal of the battery. Additionally, when front contact $c$ of relay CRA picks up, a circuit is established for shunting the resistor R1 in the circuit for supplying energy from the transformer T to the rectifier K. As a result, energy is supplied from the transformer T to the rectifier K at this time by a circuit which may be traced from terminal 9 of the secondary winding 3 of transformer T, over front contact $c$ of relay CRA, to the first input terminal of the rectifier K, and from the other input terminal of the rectifier K to terminal 11 of the secondary winding 3 of transformer T. Accordingly, a greater amount of energy is supplied from the transformer T to rectifier K since the resistor R1 is now shunted in the supply circuit, and as a result, a larger amount of direct current charging energy is supplied from the rectifier K to the battery B at this time with the load S connected to the battery. If the voltage of the battery B now rises to a sufficient value to cause relay CR to pick up its contact $a$, the stick circuit for relay CRA will be opened by back contact $a$ of relay CR. However, at this time, since contact $b$ of relay LR is released, the relay CRA is maintained picked up by the pick-up circuit previously traced, so that its contact $c$ continues to shunt the limiting resistor R1. Thus, the high rate of charge continues at this time even though relay CR is picked up. This arrangement differs somewhat from that shown in Figs. 1 and 2 in this respect, however, an advantage is gained by arranging the circuit in this manner, since the charging current is carried by the contact of relay CRA which may be constructed in a more substantial manner than the contact of relay CR since relay CR must be relatively sensitive and the contact structure must accordingly be relatively light in structure and therefore not suited for carrying extremely heavy current.

If, after relay CR is picked up, the relay LR picks up to disconnect the load S from the battery, contact $b$ of relay LR will interrupt the supply of energy to relay CRA and since the stick circuit including front contact $a$ of relay CRA is interrupted at this time by contact $a$ of relay CR, the relay CRA will release.

When relay CRA releases, it interrupts the circuit for connecting the winding of relay CR across the terminals of battery B, and relay CR releases. Additionally, front contact $c$ of relay CRA opens to thereby remove the shunt around the limiting resistor R1, so that the energy supplied from the transformer T to the rectifier K is now limited by the impedance R1 in series in the circuit, and the rate of charging of battery B is accordingly reduced. The circuit is therefore restored to its normal condition as shown on the drawing.

If relay LR picks up after having released to connect the load S to the battery, and the battery voltage has remained sufficiently low that relay CR has not picked up in the meantime to create the condition described above, relay CRA will remain picked up, since its stick circuit continues to be established over back contact *a* of relay CR and front contact *a* of relay CRA. Accordingly, the front contact *c* of relay CRA continues to shunt the limiting impedance R1, and the hight rate of charge for the battery B continues. At some time thereafter when the voltage of the battery reaches a sufficient value, the relay CR will pick up, and its contact *a* will interrupt the stick circuit of relay CRA. Since relay LR is picked up at this time, so that the pickup circuit governed by back contact *b* of relay LR is opened, relay CRA is deprived of energy and its contacts release, thereby disconnecting the charge control relay CR from the terminals of the battery B and additionally removing the shunt across resistor R1, so that the charging rate is again established at a low rate, and the apparatus is restored to its normal condition.

As previously pointed out in connection with Figs. 1 and 2, the auxiliary relay CRA is governed by the energy which is also supplied for charging the battery B, so that if an interruption of the charging energy occurs, the relay CRA will be released, to thereby disconnect the low resistance winding of relay CR from the terminals of battery B, so that under these conditions the battery is not subjected to an unnecessary drain.

From the foregoing, it will be seen that battery charging apparatus arranged in accordance with my invention provides for charging a battery at different rates, depending upon whether or not a load is connected thereto, and furthermore provides means for automatically retaining the charging rate at a predetermined value until the voltage of the battery associated with the apparatus is restored to its normal condition. Moreover, apparatus arranged in accordance with my invention will operate to automatically disconnect the voltage-sensitive or charge control relay from the terminals of the battery should a failure of the charging energy occur, so that an unnecessary drain on the battery is thereby prevented.

Although I have herein shown and described only three forms of battery charging apparatus embodying my invention, it is to be understood that various changes and modifications may be made therein within the scope of the appended claims without departing from the spirit and scope of my invention.

Having thus described my invention, what I claim is:

1. Apparatus for charging a battery from a source of charging energy comprising, in combination, a voltage-sensitive relay having a contact operated from a first position to a second position when the voltage applied to a winding of the relay is at or above a predetermined value corresponding to the fully charged voltage of the battery, an auxiliary relay, circuit means controlled by said auxiliary relay for connecting said voltage-sensitive relay across said battery at times, and other circuit means including a first position contact of said voltage-sensitive relay for governing said auxiliary relay, said other circuit means having for its source of energy said source of charging energy.

2. Apparatus for supplying charging energy to a battery from a source of charging energy comprising, in combination, a voltage-sensitive relay effectively energized when the voltage supplied to a winding of the relay is at or above a predetermined value corresponding to the fully charged voltage of the battery, an auxiliary relay, first circuit means controlled by said auxiliary relay for at times connecting the winding of said voltage-sensitive relay across said battery, second circuit means for governing said auxiliary relay and effective when a load is connected to said battery, and third circuit means for additionally governing said auxiliary relay including a contact of said voltage-sensitive relay open when said voltage-sensitive relay is effectively energized, said second and third circuit means having as a source of energy said source of charging energy.

3. Apparatus for supplying charging energy from a source of charging energy to a battery which is at times connected to a load by a circuit controller, comprising, in combination, a voltage-sensitive relay having a contact which is operated from a first to a second position when the voltage of the energy supplied to a winding of said voltage-sensitive relay is of a predetermined value corresponding to the voltage of the battery when fully charged, an auxiliary relay governed by said circuit controller, means for supplying charging energy to said battery at a low rate when said circuit controller is in the position in which the load is disconnected from the battery, means for supplying charging energy to said battery at a high rate at other times, comprising circuit means including a contact of said auxiliary relay and a contact of said voltage-sensitive relay closed in its first position, and means including a contact of said auxiliary relay for at times connecting a winding of said voltage-sensitive relay across said battery.

4. Apparatus for supplying charging energy from a source of charging energy to a battery which is at times connected to a load by a circuit controller, and having a current limiting impedance for regulating the supply of charging energy, the combination with the foregoing of a voltage-sensitive relay having a contact which is operated from a first to a second position when the voltage of the energy supplied to a winding of said voltage-sensitive relay is of at least a predetermined value corresponding to the voltage of said battery when fully charged, an auxiliary relay having contacts operated from a first to a second position when said auxiliary relay is energized, means including a contact of said auxiliary relay closed in its second position for connecting a winding of said voltage-sensitive relay across the terminals of the battery, means including a contact of said circuit controller closed in the position in which the load is connected to the battery for energizing said auxiliary relay from said source, and means governed jointly by a contact of said voltage-sensitive relay closed in its first position and a contact of said auxiliary relay closed in its second position, for shunting said circuit limiting impedance.

5. In a battery charging system for supplying charging energy at different rates to a battery, comprising a battery, a rectifier having input terminals and output terminals, said rectifier output terminals being connected to said battery, a source of alternating current connected to said input terminals of said rectifier through a current limiting impedance, a load for said battery, and a circuit controller having contacts operable at times between a first position to connect said battery to said load and a second position to disconnect said battery from said load, the combination with the foregoing of a voltage-sensitive relay having a contact operable from a first to a second position when the voltage of the energy supplied to a winding of said voltage-sensitive relay is at or above a predetermined value corresponding to the voltage of the battery when fully charged, an auxiliary relay having contacts which are closed in a first or a second position according as a winding of the auxiliary relay is deenergized or energized, first circuit means for connecting a winding of said voltage-sensitive relay across the battery including a contact of said auxiliary relay closed in its second position, second circuit means comprising a contact of said circuit controller closed in its first position for energizing said auxiliary relay from said source, third circuit means for supplying energy from said source to the winding of said auxiliary relay comprising a first position contact of said voltage-sensitive relay and a second position contact of said auxiliary relay, and means governed by said auxiliary relay for rendering said current limiting impedance ineffective when the contacts of said auxiliary relay are in their second position.

6. In combination, a battery, a source of charging energy for said battery, a load, a circuit controller for at times connecting said load to said battery, a voltage-sensitive relay having a contact which is operated from a first position to a second position when the voltage applied to a winding of the relay is at or above a predetermined value corresponding to the fully charged voltage of said battery, an auxiliary relay having contacts operated from a first to a second position when said auxiliary relay is energized, a first circuit for governing said auxiliary relay including a contact of said circuit controller closed when said circuit controller connects said load to said battery; a second circuit for connecting said winding of said voltage-sensitive relay across the battery, said second circuit including a second position contact of said auxiliary relay; and a third circuit for additionally governing said auxiliary relay, said third circuit including the contact of said voltage-sensitive relay closed in its first position, said first and third circuits having as a source of energy said source of charging energy.

7. In combination, a battery, a source of charging energy for said battery, a load, a circuit controller for at times connecting said load to said battery, a voltage-sensitive relay having a contact which is operated from a first position to a second position when the voltage applied to a winding of the relay is at or above a predetermined value corresponding to the fully charged voltage of said battery, an auxiliary relay having front contacts closed when said auxiliary relay is energized, a first circuit for supplying energy from said source to said battery including a current limiting impedance; a second circuit for supplying energy from said source to said battery including a winding of said auxiliary relay and a contact of said circuit controller closed when said circuit controller connects said load to said battery; a third circuit for supply energy from said source to said battery including a front contact of said auxiliary relay and the contact of said voltage-sensitive relay closed in its first position; and a fourth circuit for connecting the winding of said voltage sensitive relay across said battery, said fourth circuit including a front contact of said auxiliary relay.

8. In combination, a battery, a source of charging energy for said battery, a load, a circuit controller for at times connecting said load to said battery, a voltage-sensitive relay having a contact which is operated from a first position to a second position when the voltage applied to a winding of the relay is at or above a predetermined value corresponding to the fully charged voltage of said battery, an auxiliary relay having two windings and having contacts which are operated from a first position to a second position when said auxiliary relay is energized, a current limiting impedance, a first circuit for supplying energy from said source to said battery including said current limiting impedance and a contact of said circuit controller closed in the position in which the load is disconnected from the battery; a second circuit for supplying energy from said source to said battery including said current limiting impedance, a contact of said circuit controller closed in the position in which the load is connected to the battery, and one of said two windings; a third circuit for supplying energy to said battery from said source including the contact of said voltage-sensitive relay closed in its first position, a second position contact of said auxiliary relay and the other of said two windings; and a circuit including a second position contact of said auxiliary relay for connecting the winding of said voltage-sensitive relay across said battery.

9. In combination, a battery, a source of charging energy for said battery, a load, a circuit controller for at times connecting said load to said battery, a voltage-sensitive relay having a contact which is operated from a first position to a second position when the voltage applied to a winding of the relay is at or above a predetermined value corresponding to the fully charged voltage of said battery, an auxiliary relay having a continuity transfer contact operable between a released position and a picked up position when said auxiliary relay is energized, a current limiting impedance, a first circuit for supplying energy from said source to said battery including said current limiting impedance; a second circuit for supplying energy to said battery from said source including a contact of said circuit controller closed in the position in which said battery is connected to said load, said continuity transfer contact closed in its released position and the winding of said auxiliary relay; a third circuit for supplying energy from said source to said battery including the contact of said voltage-sensitive relay closed in its first position, said continuity transfer contact closed in its picked up position, and the winding of said auxiliary relay; and a fourth circuit for connecting the winding of said voltage-sensitive relay across said battery, said fourth circuit including a contact of said auxiliary relay closed in its picked up position.

10. In combination, a battery, a source of charging energy for said battery, a load, a circuit controller for at times connecting said load to said battery, a voltage-sensitive relay having a contact which is operated from a first position to a second position when the voltage of the energy supplied to a winding of the relay is at or above a predetermined value corresponding to the fully charged voltage of said battery, an auxiliary relay having a continuity transfer contact operable between a released position and a picked up position when said auxiliary relay is energized, a current limiting impedance, an auxiliary impedance, a first circuit for supplying energy from said source to said battery including said current limiting impedance; a second circuit for supplying energy to said battery from said source including a contact of said circuit controller closed in the position in which said battery is connected to said load, said continuity transfer contact closed in its released position and the winding of said auxiliary relay; a third circuit for supplying energy from said source to said battery including the contact of said voltage-sensitive relay closed in its first position, said continuity transfer contact closed in its picked up position, and the winding of said auxiliary relay; a fourth circuit for supplying energy from said source to said battery including a contact of said circuit controller closed in the position in which said load is connected to said battery, said auxiliary impedance, and the winding of said auxiliary relay; and a fifth circuit for connecting the winding of said voltage-sensitive relay across said battery, said fifth circuit including a contact of said auxiliary relay closed in its picked up position.

11. In combination, a battery, a source of charging energy for said battery, a load, a circuit controller for at times connecting said load to said battery, a voltage-sensitive relay having a contact which is operated from a first position to a second position when the voltage applied to a winding of the relay is at or above a predetermined value corresponding to the fully charged voltage of said battery, an auxiliary relay having front contacts which are closed when said auxiliary relay is energized, a first circuit for governing said auxiliary relay including a contact of said circuit controller closed when said circuit controller connects said load to said battery and including a front contact of said auxiliary relay; a second circuit including a front contact of said auxiliary relay for connecting the winding of said voltage-sensitive relay across said battery; a third circuit for governing said auxiliary relay including the contact of said voltage-sensitive relay closed in its first position and a front contact of said auxiliary relay; a current limiting impedance, a fourth circuit for supplying energy from said source to said battery including said current limiting impedance, and a fifth circuit for supplying energy from said source to said battery including a front contact of said auxiliary relay; said first and said third circuits having as a source of energy said source of charging energy.

12. In combination, a battery, a source of charging energy for said battery, a load, a circuit controller for at times connecting said load to said battery, a voltage-sensitive relay having a contact which is operated from a first position to a second position when the voltage applied to a winding of the relay is at or above a predetermined value corresponding to the fully charged voltage of said battery, an auxiliary relay having front contacts which are closed when said auxiliary relay is energized, a first circuit for governing said auxiliary relay including a contact of said circuit controller closed when said circuit controller connects said load to said battery; a second circuit including a front contact of said auxiliary relay for connecting the winding of said voltage-sensitive relay across said battery; a third circuit for governing said auxiliary relay including the contact of said voltage-sensitive relay closed in its first position and a front contact of said auxiliary relay; a current limiting impedance, a fourth circuit for supplying energy from said source to said battery including said current limiting impedance, and a fifth circuit including a front contact of said auxiliary relay for shunting said current limiting impedance, said first and said third circuits having as a source of energy said source of charging energy.

13. Apparatus for charging a battery from a source of charging energy comprising, in combination, a first pair of terminals adapted to be connected with the battery, a second pair of terminals adapted to be connected with the source of charging energy, a voltage-sensitive relay having a contact operated from a first position to a second position when the voltage applied to a winding of the relay is at or above a predetermined value corresponding to the fully charged voltage of the battery, an auxiliary relay, circuit means governed by said auxiliary relay for connecting said voltage-sensitive relay to said first pair of terminals at times, and other circuit means connected to said second pair of terminals and including a first position contact of said voltage-sensitive relay for governing said auxiliary relay, whereby when said second pair of terminals are connected with the source of charging energy, the energy for said other circuit means will be supplied from said source of charging energy.

14. Apparatus for supplying charging energy to a battery from a source of charging energy comprising, in combination, a first pair of terminals adapted to be connected with the battery, a second pair of terminals adapted to be connected with the source of charging energy, a voltage-sensitive relay effectively energized when the voltage supplied to a winding of the relay is at or above a predetermined value corresponding to the fully charged voltage of the battery, an auxiliary relay, first circuit means governed by said auxiliary relay for at times connecting the winding of said voltage sensitive relay to said first pair of terminals, whereby said voltage-sensitive relay is adapted to be effectively connected across said battery, second circuit means for governing said auxiliary relay and effective when a load is connected to the battery, and third circuit means for additionally governing said auxiliary relay including a contact of said voltage-sensitive relay open when said voltage-sensitive relay is effectively energized, said second and third circuit means being connected to said second pair of terminals, whereby when said second pair of terminals are connected to the source of charging energy said second and third circuits will be energized from said source of charging energy.

15. Apparatus for supplying charging energy from a source of charging energy to a battery which is at times connected to a load by a circuit controller, comprising, in combination, a first pair of terminals adapted to be connected to the battery, a second pair of terminals adapted to be connected to the source of energy, a voltage-sensitive relay having a contact which is operated from a first to a second position when the voltage of the energy supplied to a winding of said voltage-sensitive relay is of a predetermined value corresponding to the voltage of the battery when fully charged, an auxiliary relay governed by said circuit controller, means for supplying charging energy from said second pair of terminals to said first pair of terminals at a low rate when said circuit controller is in the position in which the load is disconnected from the battery, means for supplying charging energy from said second pair of terminals to said first pair of terminals at a high rate at other times comprising circuit means including a contact of said auxiliary relay and a contact of said voltage-sensitive relay closed in its first position, and means including a contact of said auxiliary relay for at times connecting a winding of said voltage-sensitive relay across said first pair of terminals.

16. In apparatus for supplying charging energy from a source of charging energy to a battery which is at times connected to a load by a circuit controller, and having a current limiting impedance for regulating the supply of charging energy, the combination of a first pair of terminals adapted to be connected to the battery, a second pair of terminals adapted to be connected to the source of charging energy, a voltage-sensitive relay having a contact which is operated from a first to a second position when the voltage of the energy supplied to a winding of said voltage-sensitive relay is of at least a predetermined value corresponding to the voltage of said battery when fully charged, an auxiliary relay having contacts operated from a first to a second position when said auxiliary relay is energized, means including a contact of said auxiliary relay closed in its second position for connecting a winding of said voltage-sensitive relay to said first pair of terminals, means including a contact of said circuit controller closed in the position in which the load is connected to the battery for connecting said auxiliary relay to said second pair of terminals, whereby said auxiliary relay is energized from said source, and means governed jointly by a contact of said voltage-sensitive relay closed in its first position and a contact of said auxiliary relay closed in its second position, for shunting said circuit limiting impedance.

17. In a battery charging system for supplying charging energy at different rates to a battery comprising a rectifier having input terminals and output terminals, said rectifier output terminals being connected to said battery, a source of alternating current connected to said input terminals of said rectifier through a current limiting impedance, a load for said battery, and a circuit controller having contacts operable at times between a first position to connect said battery to said load and a second position to disconnect said battery from said load, the combination of a first pair of terminals adapted to be connected to the battery, a second pair of terminals adapted to be connected to said source of alternating current, a voltage-sensitive relay having a contact operable from a first to a second position when the voltage of the energy supplied to a winding of said voltage-sensitive relay is at or above a predetermined value corresponding to the voltage of the battery when fully charged, an auxiliary relay having contacts which are closed in a first or a second position according as a winding of the auxiliary relay is deenergized or energized, a first circuit means for connecting a winding of said voltage-sensitive relay to said first pair of terminals including a contact of said auxiliary relay closed in its second position, second circuit means comprising a contact of said circuit controller closed in its first position for connecting said auxiliary relay to said second pair of terminals, whereby said auxiliary relay is energized from said source, third circuit means including said second pair of terminals for supplying energy from said source to the winding of said auxiliary relay comprising a first position contact of said voltage-sensitive relay and a second position contact of said auxiliary relay, and means governed by said auxiliary relay for rendering said current limiting impedance ineffective when the contacts of said auxiliary relay are in their second position.

ARTHUR E. DODD.

REFERENCES CITED

The following references are of record in the file of this patent:

UNITED STATES PATENTS

| Number | Name | Date |
|---|---|---|
| 1,393,503 | Clausen | Oct. 11, 1921 |
| 1,791,156 | Beetem | Feb. 3, 1931 |
| 1,852,799 | Cheeseman | Apr. 5, 1932 |
| 1,865,595 | Spangler | July 5, 1932 |
| 2,096,440 | Wetzer | Oct. 19, 1937 |
| 2,139,330 | Gilson | Dec. 6, 1938 |
| 2,165,174 | Bridges et al. | July 14, 1939 |